S. SOKOLOW & S. POLINSKY.
MEANS FOR FORMING BATTERY ELEMENTS, &c.
APPLICATION FILED FEB. 23, 1917.

1,302,237.

Patented Apr. 29, 1919.
10 SHEETS—SHEET 1.

INVENTORS:
Samuel Sokolow, Samuel Polinsky,
BY Geo. Wm Miatt
ATTORNEY.

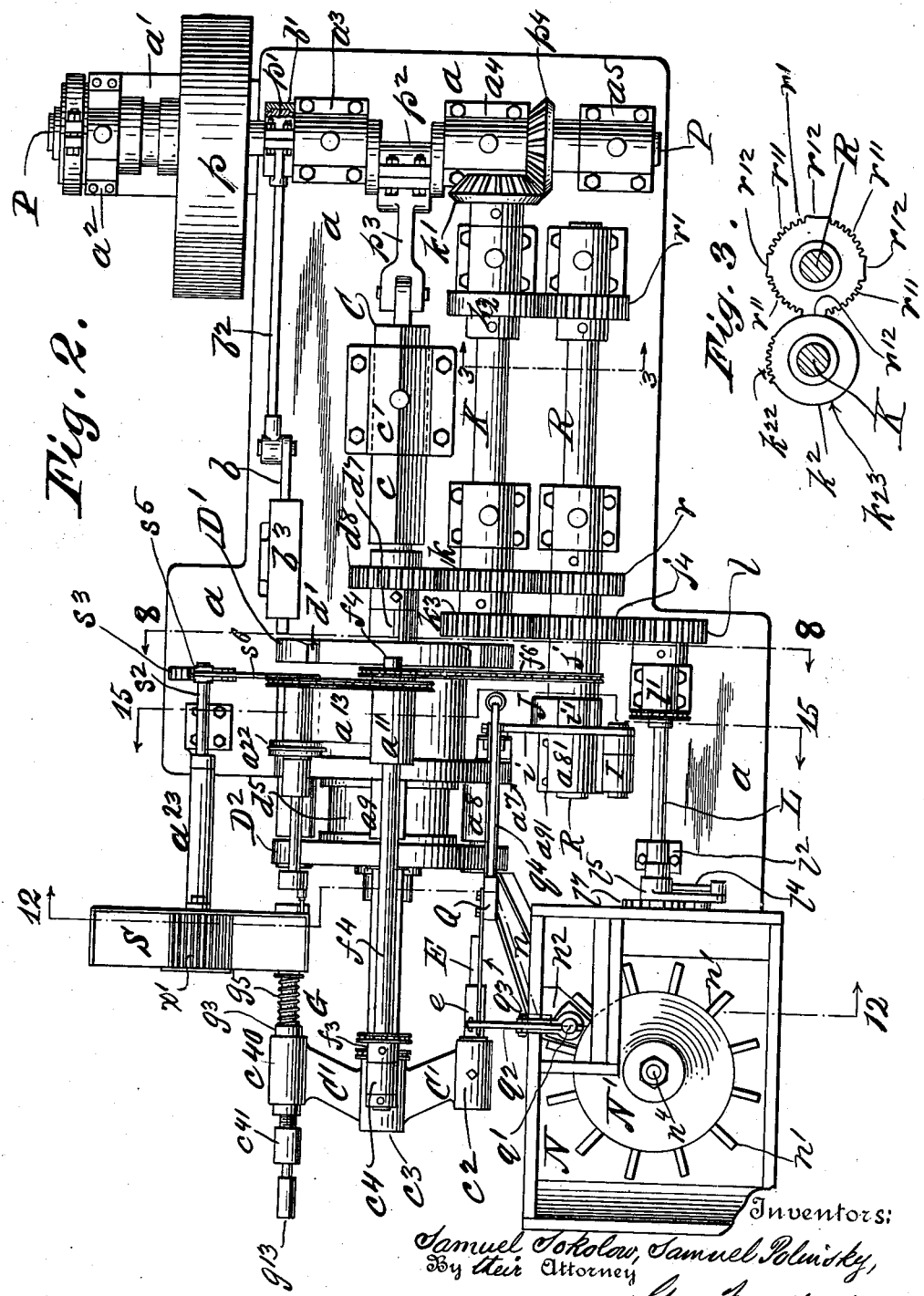

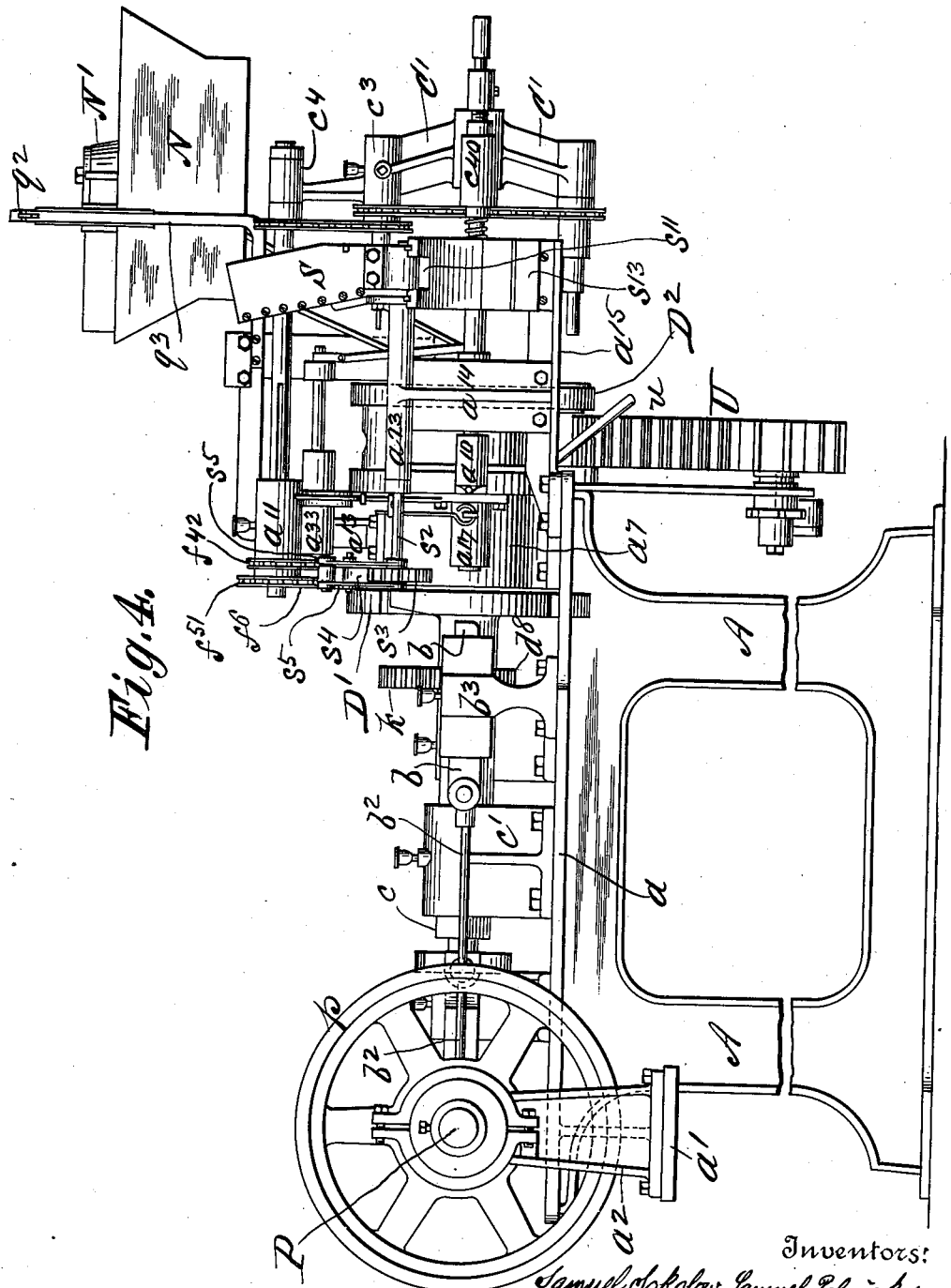

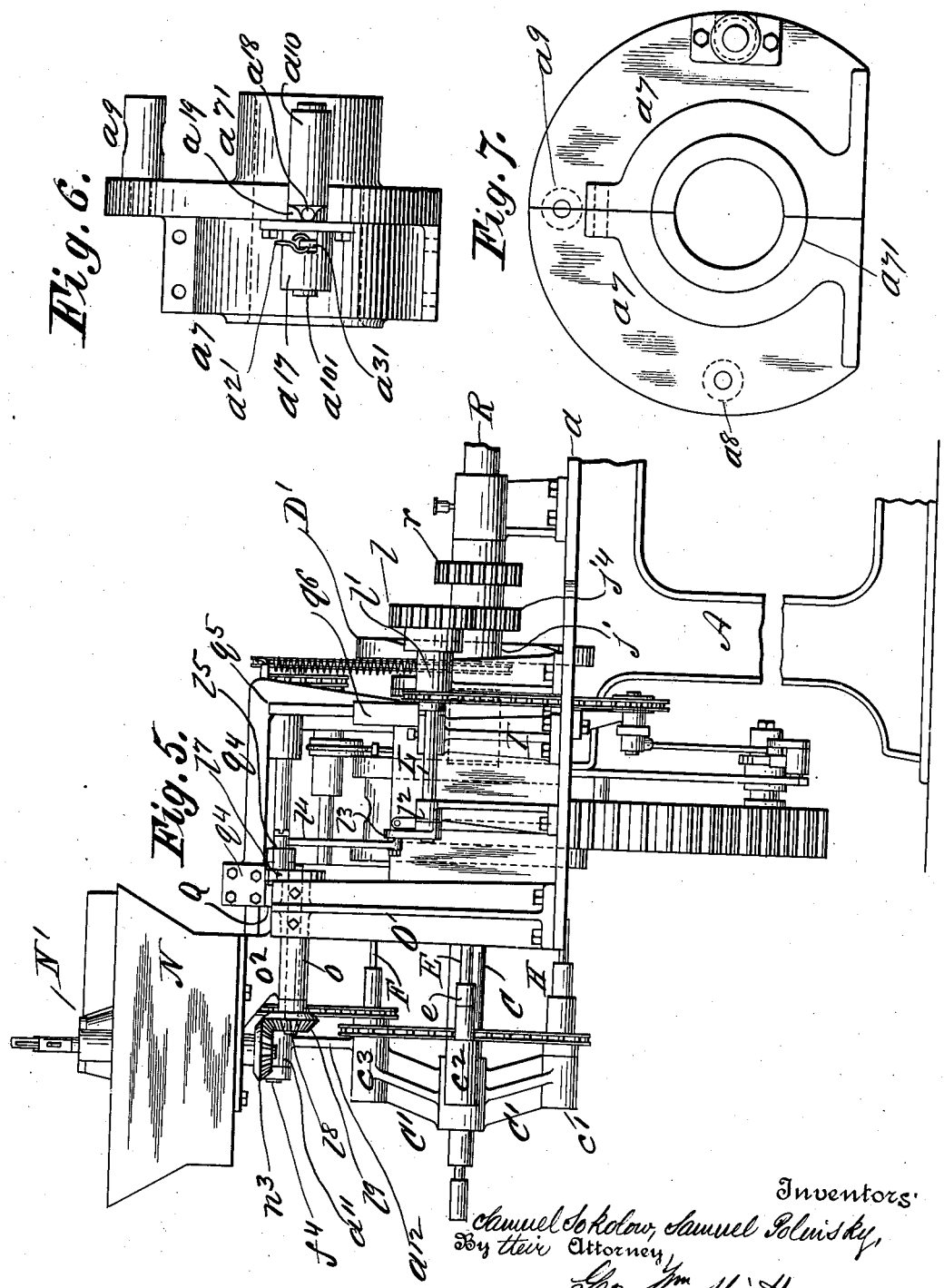

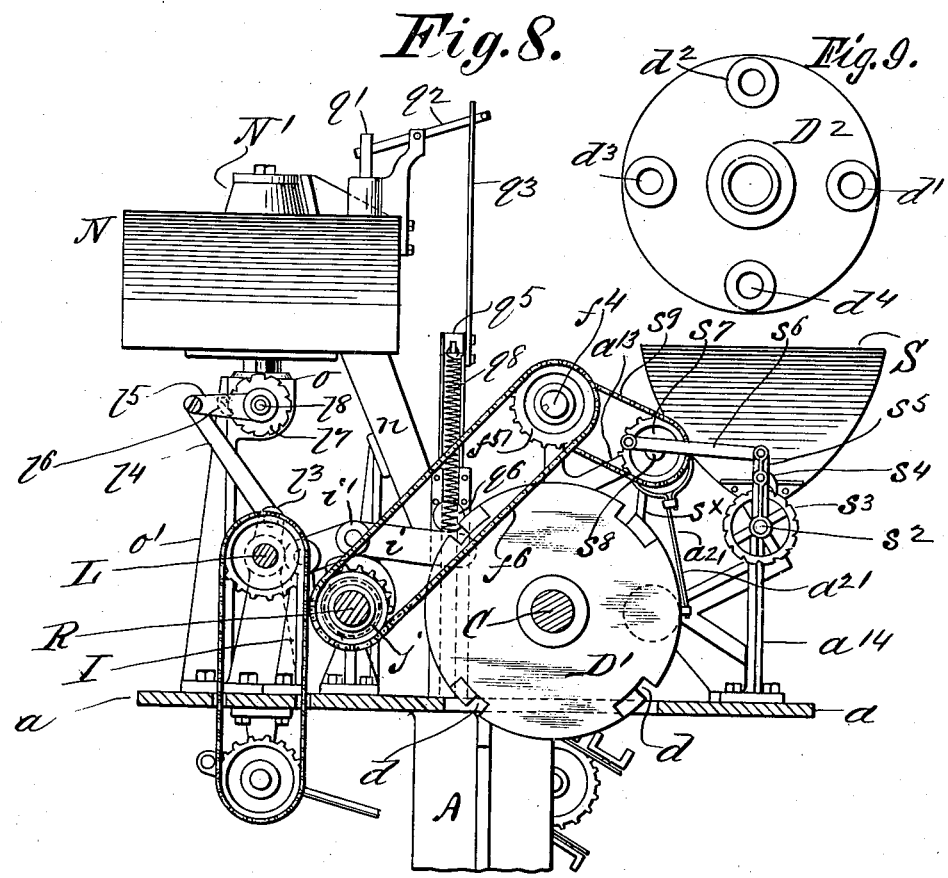
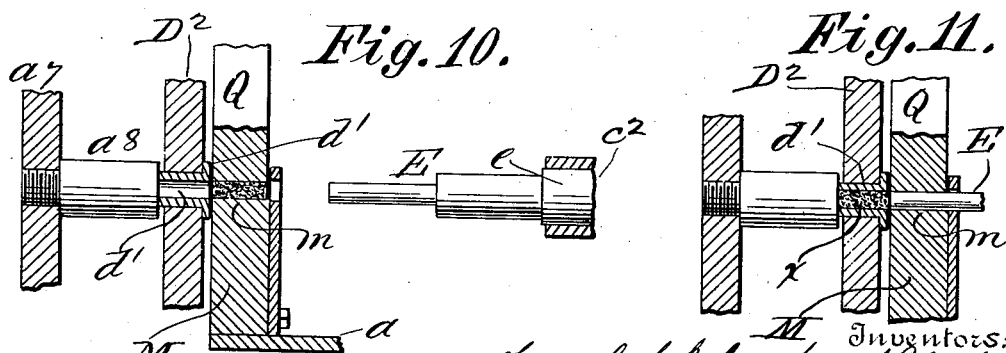

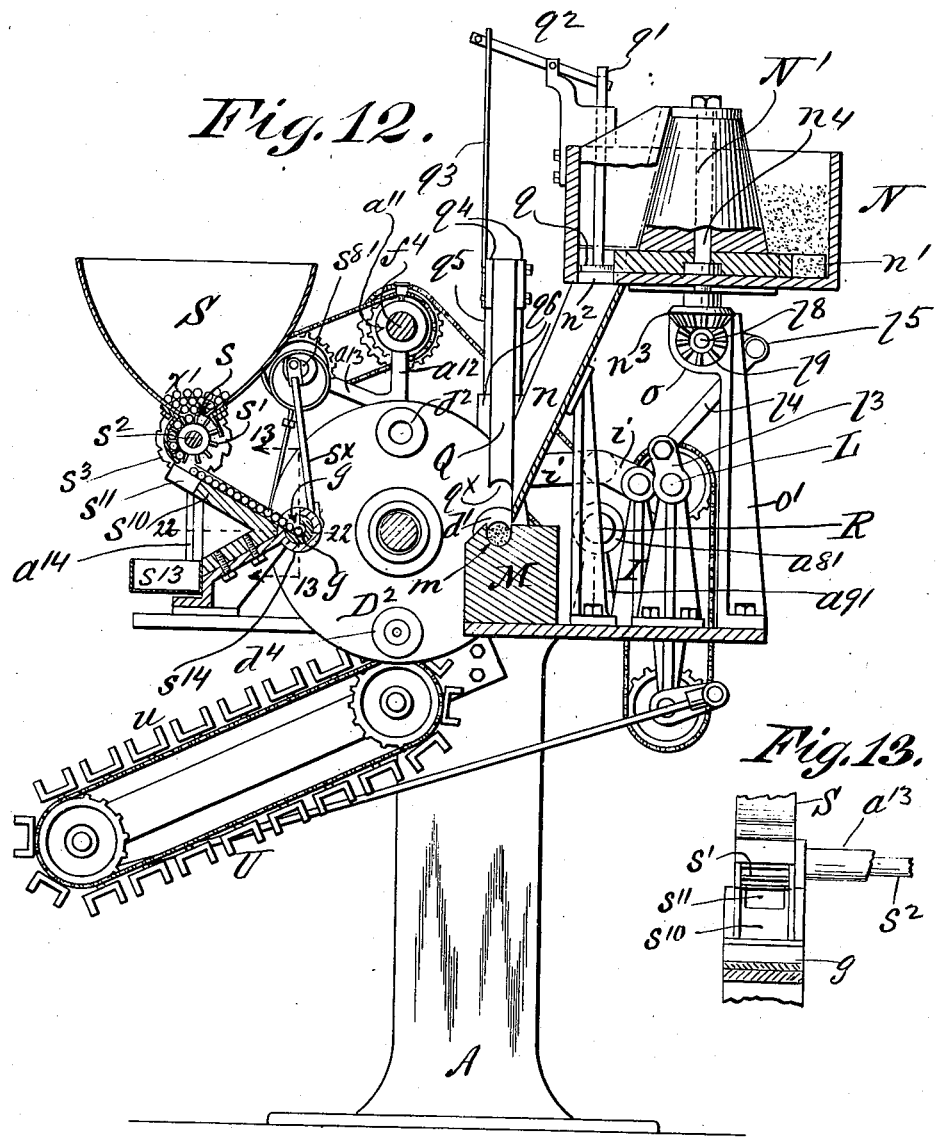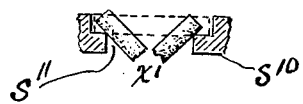

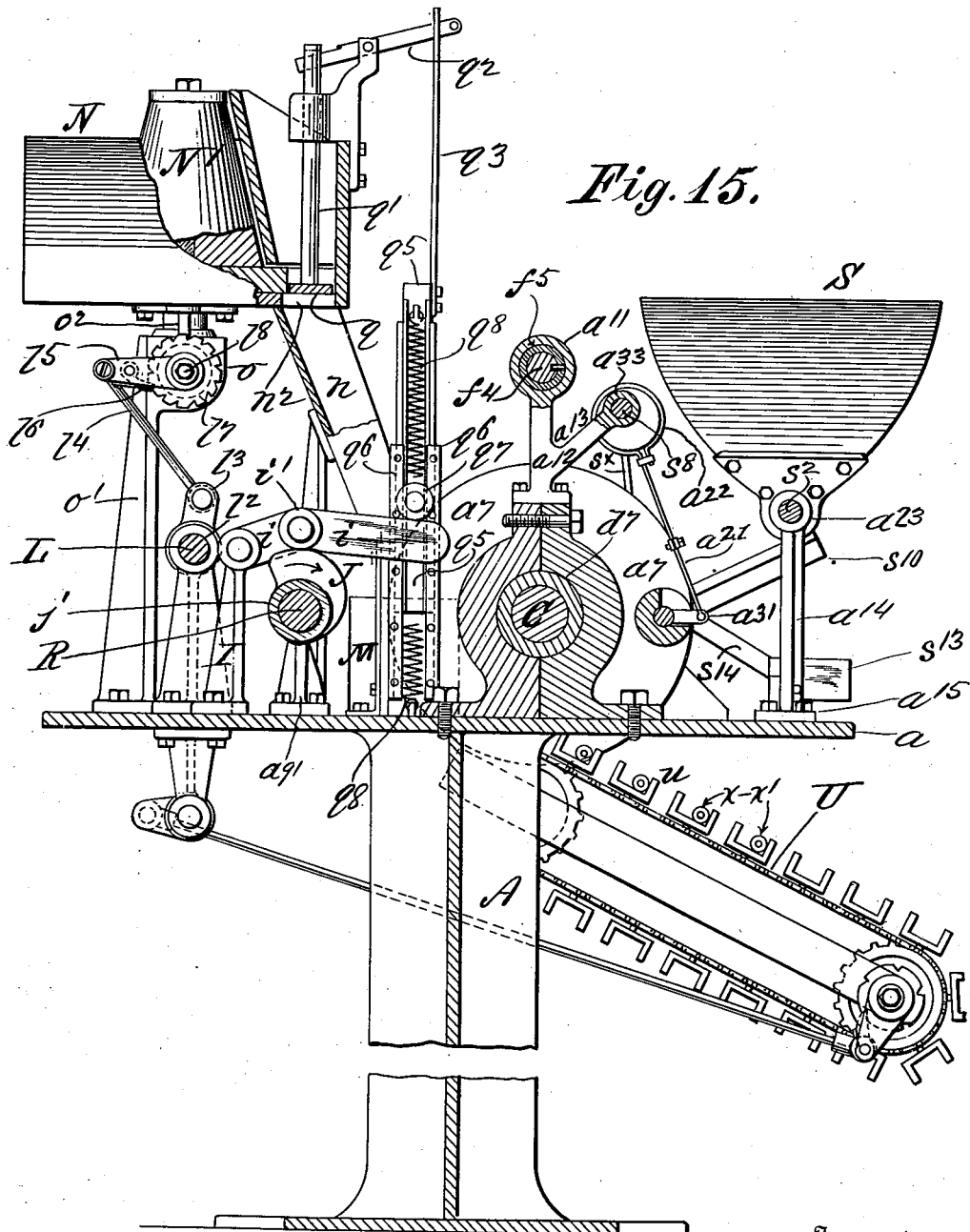

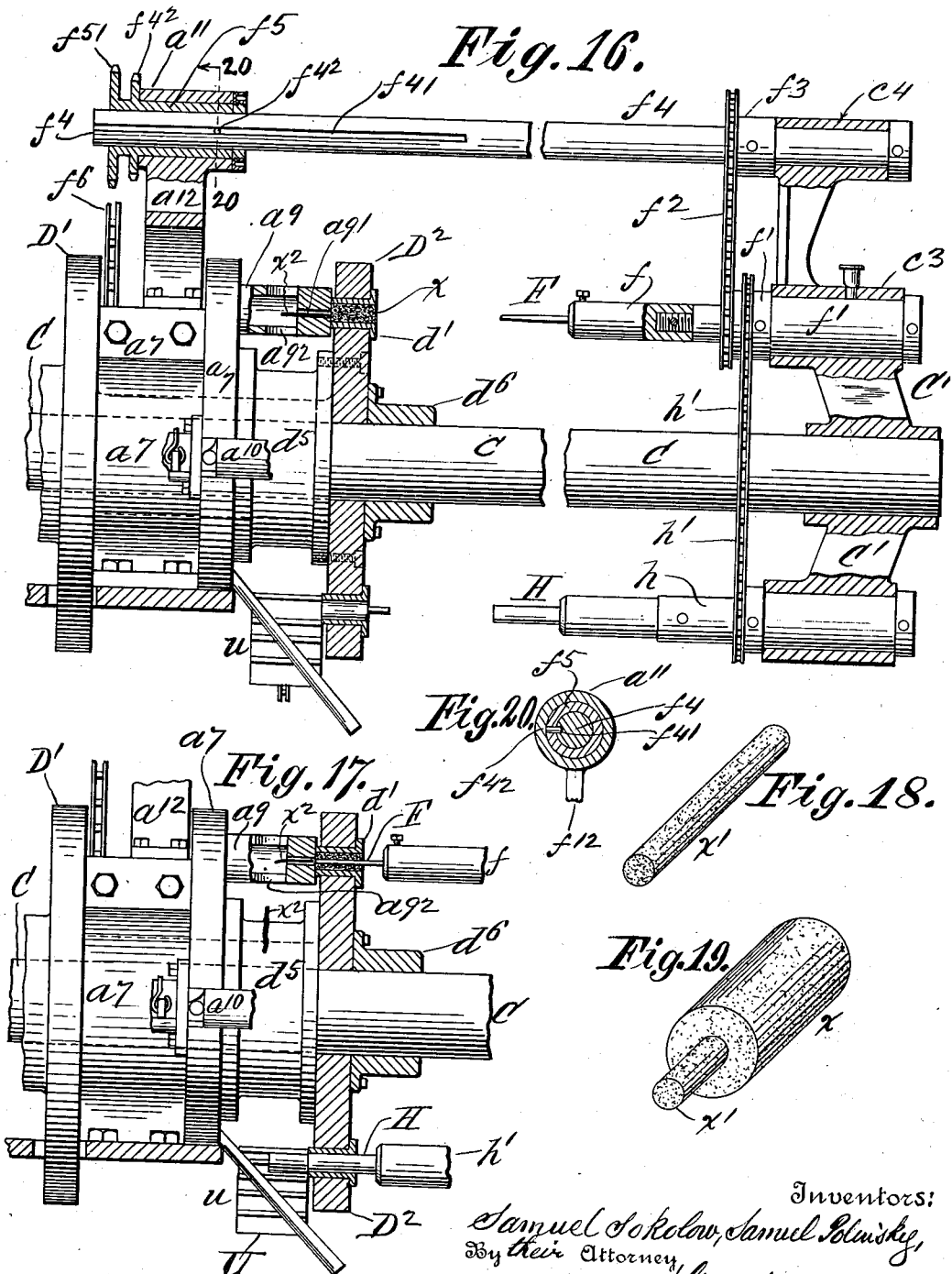

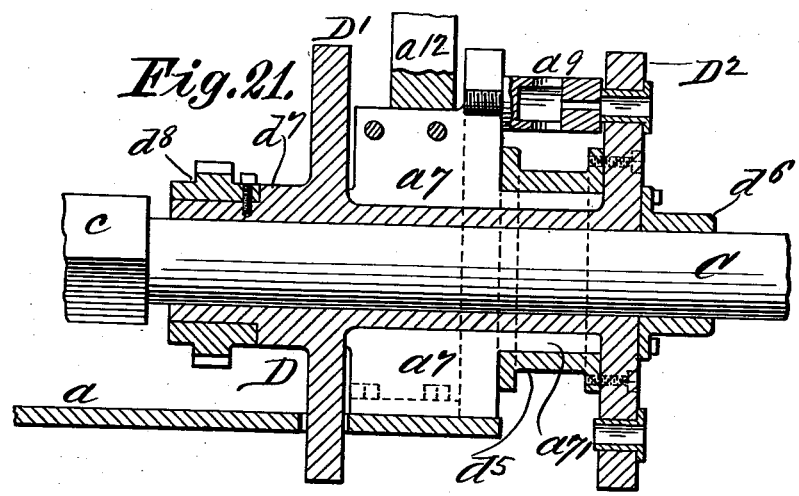
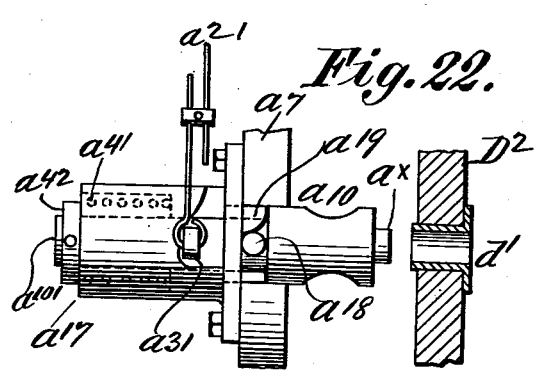 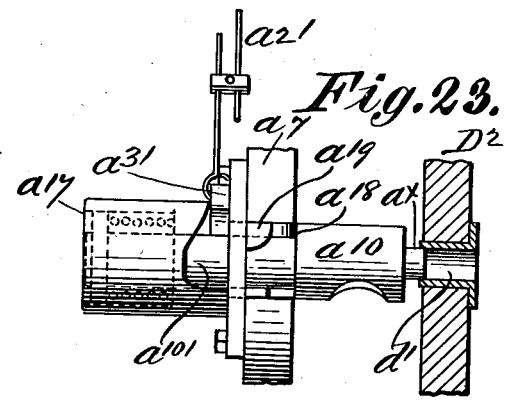
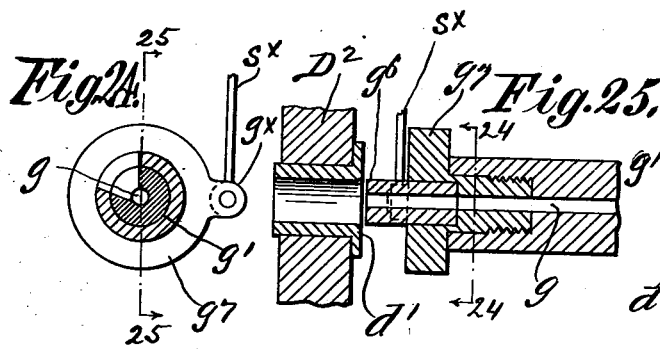 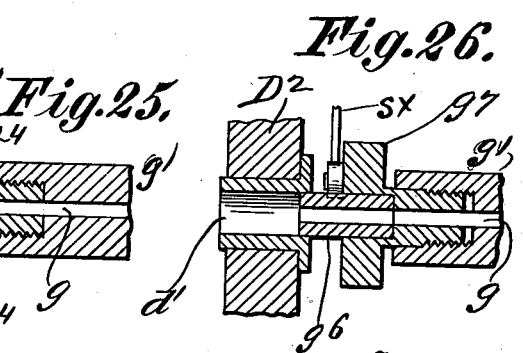

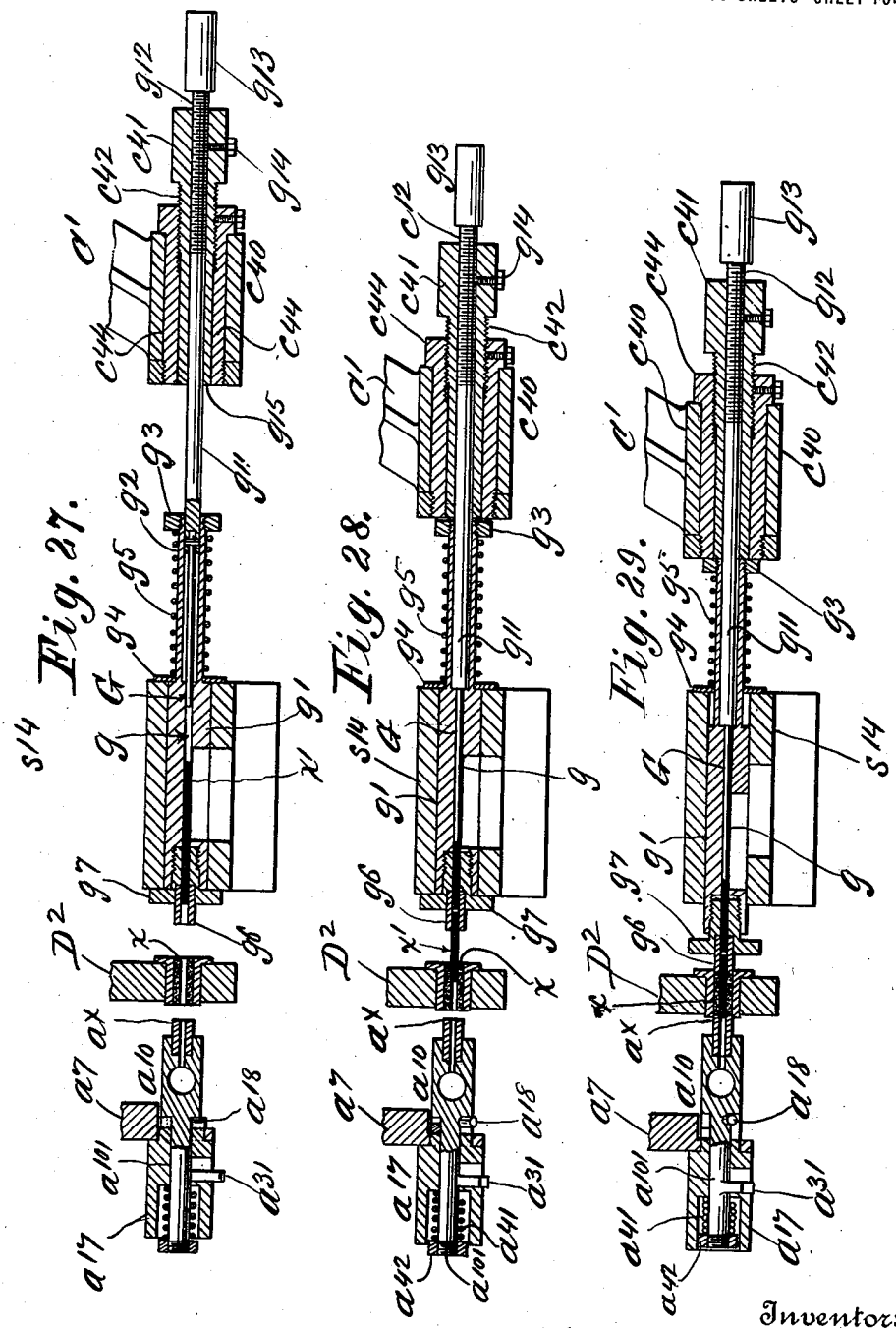

UNITED STATES PATENT OFFICE.

SAMUEL SOKOLOW AND SAMUEL POLINSKY, OF NEW YORK, N. Y., ASSIGNORS TO CONRAD HUBERT, OF WHITE PLAINS, NEW YORK.

MEANS FOR FORMING BATTERY ELEMENTS, &c.

1,302,237.

Specification of Letters Patent. Patented Apr. 29, 1919.

Application filed February 23, 1917. Serial No. 150,439.

*To all whom it may concern:*

Be it known that we, SAMUEL SOKOLOW, a citizen of the United States, and a resident of the borough of Manhattan, city, county, and State of New York, and SAMUEL POLINSKY, a subject of the Czar of Russia, (having declared intentions of becoming a citizen of the United States,) and a resident of the borough of Manhattan, city, county, and State of New York, have invented certain new and useful Improvements in Means for Forming Battery elements, &c., of which the following is a specification.

Our invention relates to means for effecting the automatic formation of carbon elements for electrical dry batteries, the same having heretofore commonly been made by hand, which involves considerable expense and lack of uniformity of product. These carbon elements consist of a central stem or pencil of carbon forming an electrode rod around a portion of which is molded a cylindrical mass of depolarizing material such as carbon agglomerate.

The object of our invention is the production of apparatus that will automatically feed and compress the agglomerate into cylindrical form, pierce the cylinder thus formed for the reception of the central carbon stem, insert said carbon stem, and then effect the discharge of the finished product, the several operations being effected simultaneously after the first cycle, all as hereinafter fully set forth. Hence the invention consists in the construction and arrangement of parts described and claimed,—distinctive features being the intermittently rotatable carrier disk, and the coöperative parts for performing the several functions mentioned.

The terms "tube" and "tubular" as applied to a charge of depolarizing material herein in the specification and claims are employed in a broad sense as denoting a hollow or apertured mass not necessarily cylindrical.

In the accompanying drawings,

Fig. 2, is a plan of the same;

Fig. 3, is a section on plane of line 3—3, Fig. 2, showing the intermittent gears;

Fig. 4, is a side elevation of the apparatus;

Fig. 5, is an elevation of a portion of the side of the machine opposite to that shown in Fig. 4;

Fig. 6, is a side elevation of the main bracket member;

Fig. 7, is a rear elevation thereof;

Fig. 8, is a sectional elevation taken upon plane of line 8—8, Fig. 2;

Fig. 9, is a front elevation of the holder transfer disk;

Figure 1:
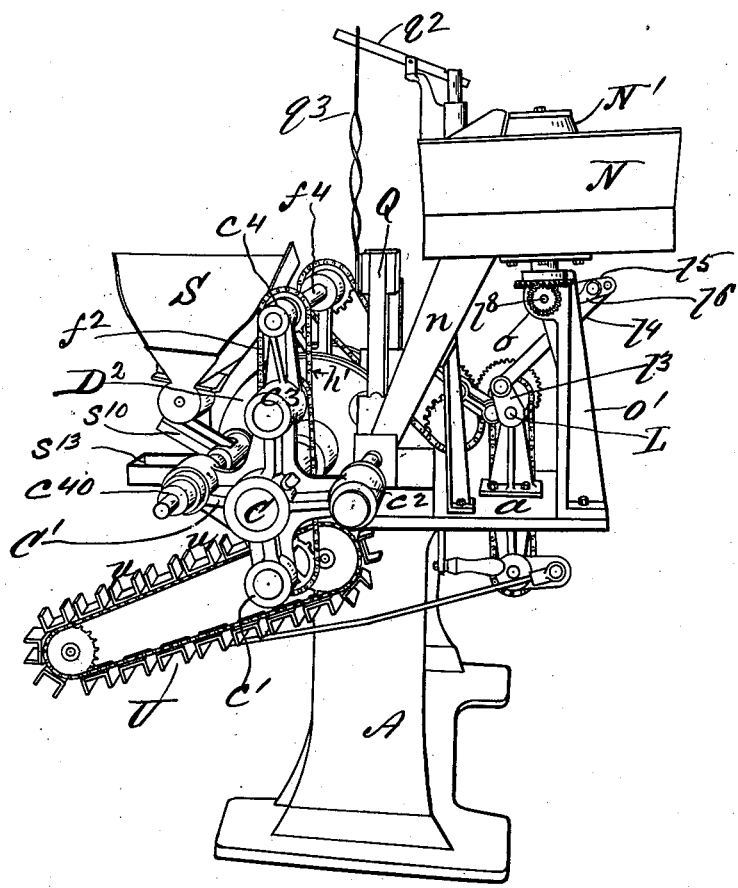
Figure 1, is a perspective view of the front end of apparatus embodying the essential features of our invention.

Figs. 10, and 11, are sectional details illustrating the first operation,—that of forming and compressing the agglomerate cylinder laterally and transferring it to the holder;

Fig. 12, is a sectional elevation taken upon the irregular line 12—12, Fig. 2, and looking from the front of the apparatus;

Fig. 13, is a section upon plane of line 13—13, Fig. 12;

Fig. 14, is a diagram illustrating the function of the exit for broken or defective electrode rods or cores;

Fig. 15, is a vertical sectional elevation taken upon plane of line 15—15, Fig. 2, looking forward;

Fig. 16, is a sectional elevation upon a larger scale showing in detail the parts for effecting the perforation of the agglomerate cylinder and the discharge of the finished product,—the punches or plungers being in retracted position;

Fig. 17, is a similar view showing the punches in action;

Fig. 18, is a perspective view of one of the carbon cores;

Fig. 19, is a perspective view of the finished product as discharged from the apparatus;

Fig. 20, is a section taken upon plane of line 20—20, Fig. 16;

Fig. 21, is a sectional detail of the intermittent rotor or holder carriage, etc.;

Fig. 22, is a side elevation of a portion of the mechanism for inserting the carbon core into the cylinder of agglomerate and for compressing the latter endwise;

Fig. 23, is a similar view showing the abutment advanced;

Fig. 24, is a transverse section upon plane of line 24—24, Fig. 25;

Fig. 25, is a section taken upon plane of line 25—25, Fig. 24;

Fig. 26, is a similar section showing the presser advanced;

Figs. 27, 28, and 29, are horizontal sectional views illustrating the successive steps in introducing the carbon core rod into the agglomerate cylinder and in compressing the latter endwise.

In the drawings A, represents the standard support for the work table $a$, and the bracket $a'$, which latter is on a lower level than the table $a$, and affords support for the bearing standard $a^2$, on which the outer end of the power shaft P, is mounted,—the difference in level between the table $a$, and said bracket $a'$, affording accommodation for the peripheral portion of the power pulley $p$, as shown in Figs. 2 and 4.

The power shaft is also supported in bearings $a^3$, $a^4$, $a^5$, on the table $a$. An eccentric $p'$, on said power shaft P, operates the bolt $b$, by means of the eccentric sleeve $b'$, (Fig. 2) and pitman rod $b^2$, which latter is pivotally connected to the said bolt $b$. The bolt $b$, is slidably mounted in the standard $b^3$, affixed to the table $a$, and locks the intermittently rotatable transfer member D, while the punches are doing their work as hereinafter set forth,—the outer end of said bolt protruding at the proper time into one of the recesses $d$, (Fig. 8) formed for the purpose in the rear disk D', of said intermittent transfer rotor D, the forward disk $D^2$, of which carries the four equidistant cylindrical blank holders $d'$, $d^2$, $d^3$, $d^4$, as shown in Fig. 9.

By reference particularly to Fig. 21, it will be seen that the intermittent-rotor-member D, is mounted in a box bracket $a^7$, secured to the table $a$, said box bracket being made in two parts as shown in Figs. 7 and 15, to facilitate the assembling of parts, and being formed with a sleeve extension $a^{71}$, to accommodate a shield sleeve $d^5$, secured to the transfer disk $D^2$, and interposed between it and said box bracket $a^7$. The front of the transfer disk $D^2$, is also provided with an extension sleeve $d^6$, which also acts as a shield to shed any agglomerate dust escaping from the charge holder; and the rear end of the hub $d^7$, of this intermittent rotor member D, has mounted rigidly upon it a gear $d^8$, which meshes with the gear $k$, on the drive shaft K. Said gear $k$, is loose upon the shaft K, and is driven intermittently by the gear $r$, affixed to the intermittently rotatable shaft R, having affixed to it the intermittent gear $r'$, which engages with the intermittent gear $k^2$, affixed to the constantly rotating drive shaft K. These two intermittent gears $k^2$, and $r'$, are shown in detail in Fig. 3, by reference to which it will be seen that the gear $k^2$, has only one toothed peripheral segment $k^{22}$, while the gear $r'$, has four toothed peripheral segments $r''$, the intervening spaces $r^{12}$, being concave and conforming to the toothless peripheral pitch $k^{23}$, of the drive gear $k^2$. Thus the drive gear $k^2$, will rotate four times to effect a complete rotation of the intermittent gear $r'$.

A crank pin $p^2$, on the power shaft P, effects the reciprocation by means of the pitman $p^3$, of the rod C, which carries the punches, at the forward end of the apparatus, said rod C, extending through the intermittent rotor D, and having mounted upon its forward end the four armed cross head C'. The rear portion $c$, of the slide rod C, is of angular form in cross section, preferably square, and is mounted in a bearing standard $c'$, rigidly secured to the table $a$, and having a bearing and cap adapted to the angular cross section of said rear portion $c$, of the rod C. This structure prevents the turning of the slide rod C, on its longitudinal axis and insures the accurate alinement of the punches E, F, G, and H, with relation to the holders $d'$, $d^2$, $d^3$, $d^4$, carried by the forward disk $D^2$, of the intermittent rotor D.

The shank $e$, of the punch E, is rigidly mounted in the socket $c^2$ of the cross head C' (Figs. 5 and 10). This punch E, is in reality a forwarding punch, since its function is to transfer the cylinder of compressed agglomerate $x$, from the matrix $m$, in the mold-block M, which latter is rigidly attached to the table $a$.

The agglomerate is fed in loose form to the matrix $m$, through the chute $n$, which receives the agglomerate in moist condition from the hopper N. Rotatably mounted in the latter is the conical feed member N', formed with the radial arms $n'$, which convey the agglomerate to the discharge orifice $n^2$, in the bottom of the hopper. The distance between the adjacent radial arms $n'$, prescribes in a degree the quantity of agglomerate for each charge, and the descent of the latter into the chute $n$, is positively insured by the pusher $q$, attached to the lower end of the rod $q'$, the upper extremity of which is connected with the rock lever $q^2$, which is actuated by the rod $q^3$, attached indirectly to the former Q. The former Q, is rigidly attached to the forward end of the arm $q^4$, (Fig. 5) forming part of the vertical slide $q^5$, the flanged edges of which rest between vertical ways $q^6$, $q^6$, rigidly attached to the table $a$. The vertical slide $q^5$, carries a roller $q^7$ (Fig. 15), which rests on the rock lever $i$, fulcrumed on the standard I, rigidly attached to the table $a$. The rock lever $i$, carries a roller $i'$, which in turn rests upon the cam J, the hub $j$, of which is mounted loosely on the shaft R, the forward end of which is journaled in the bearing $a^{81}$, on the standard $a^{91}$, (Figs. 2 and 12) also rigidly attached to the table $a$. A spring $q^8$, is attached to the table $a$, and to the upper part of the vertical slide $q^5$, and tends constantly to hold the roller $q^7$, in contact with the rock lever $i$, and the roller $i'$, in contact with the cam J. The latter is rotated continuously, and is formed to provide for the rest of the lever $i$, for about two thirds of the rotation of said cam, the other third, the thrust, being employed to raise the pusher $q$, out of the way of the radial arms $n'$, of the conical feeder $N'$, when the latter is partially turned to effect a fresh feed of agglomerate to the discharge orifice $n^2$. The hub $j$, of the cam J, is formed with a gear $j^4$, which derives its motion from the gear $k^3$, affixed to the main drive shaft K, which is in continuous rotation by reason of the engagement of its miter gear $k'$, with the miter gear $p^4$, on the power shaft P. The cam gear $j^4$, meshes with the gear $l$, on the countershaft L, which is mounted in the bearings $l'$, $l^2$, upon standards attached to the table $a$. To the front end of the countershaft L, is secured the crank $l^3$, to which is pivotally attached the connection rod $l^4$, also pivotally attached to the ratchet lever $l^5$, carrying the pawl $l^6$, which engages with the ratchet wheel $l^7$, which is rigidly attached to the rear end of the shaft $l^8$, which is journaled in the bearing sleeve $o$, (see Fig. 5) forming part of the bracket $o^2$, which supports the hopper N, said bracket $o^2$, being rigidly attached to the standard $o'$, secured to the front of the table $a$. To the front end of the ratchet shaft $l^8$, is secured the beveled gear $l^9$, which meshes with the miter gear $n^3$, on the lower end of the spindle $n^4$, on which the conical feed member $N'$, is mounted, as shown more particularly in Fig. 12. The ratchet $l$, has twelve teeth corresponding in number to the spaces between the radial arms $n'$, on the lower portion of said conical feed member $N'$; and the rotation of the countershaft L, is so timed, through the intermediate gearing and connections as to cause crank $l^3$, connection rod $l^4$, ratchet lever $l^5$, and pawl $l^6$, to advance the ratchet $l^7$, one notch for each revolution of the power shaft P, thereby turning the conical feed member $N'$, one twelfth of a rotation on its axis, and bringing a fresh charge of agglomerate $x$, into coincidence with the discharge orifice $n^2$, to be ejected therethrough into the chute $n$, by the pusher $q$, operated by the spring $q^3$, when the former Q, has been raised by the cam J, acting through the medium of the roller $i'$, lever $i$, and roller $q^6$, against the action of the spring $q^3$.

The lower end of the former Q, is formed with a semi-cylindrical concavity $q^x$, (Fig. 12) to correspond to the semi-cylindrical matrix $m$, in the mold-block M; and the descent of the former Q, compresses the charge of agglomerate $x$, laterally in the matrix $m$, as illustrated in Fig. 10, the cylinder of agglomerate thus formed being then transferred by the forwarding punch E, from the matrix $m$, into the cylindrical holder $d'$, which is in coincidence with said matrix $m$. In doing this the forwarding punch E, forces the rear end of the charge $x$, against the opposed end of the solid abutment $a^8$, which is positioned on the front face of the box bracket $a^7$,—thereby compressing the agglomerate charge $x$, in the direction of its length and rendering it more compact and uniform in structure.

As the forwarding punch E, recedes with the cross head C', and other punches mounted thereon, the intermittent rotor D, makes a quarter turn by reason of the quarter turn of the intermittent shaft R, acting through the gears $r$, $k$, and $d^8$, thus carrying the holder $d'$, with the compressed cylindrical charge $x$, of agglomerate up into coincidence axially with the piercing punch F, as shown in Figs. 16 and 17. The inward stroke of the slide rod C, and cross head C', under the action of the crank $p^2$, causes the punch F, to pierce the charge of agglomerate X, centrally, as illustrated in Fig. 17, to form an axial socket or hole for the reception of the carbon pencil or core $x'$, (Fig. 18) the displaced and discarded matter $x^2$, left in the bore $a^{91}$, by the preceding operation being ejected through the hole $a^{92}$, in the hollow abutment $a^9$, which however otherwise sustains the agglomerate charge $x$, in the holder $d'$. Like the abutment $a^8$, the abutment $a^9$, is positioned on the face of the box bracket $a^7$, and it is formed not only with the axial bore $a^{91}$, but also with the outlet $a^{92}$, for the escape of the discard $x^2$.

The piercing punch F, is mounted in a shank $f$, secured to a rotatable hub $f'$, journaled in the socket $c^3$, of the cross head C', as shown in Fig. 16, said hub $f'$, being rotated by means of a sprocket chain $f^2$, engaging sprocket teeth on the hub $f'$, of said punch F, and also engaging sprocket teeth on a hub $f^3$, rigidly secured to the rotatable shaft $f^4$. This shaft $f^4$, is mounted in and between a bearing $c^4$, integral with the socket $c^3$, and a bearing $a''$, forming part of a standard $a^{12}$, rigidly attached to the top of the box bracket $a^7$, (Figs. 15 and 16)—the shaft $f^4$, being formed with a longitudinal groove $f^{41}$, for engagement with a key pin $f^{42}$, (see Fig. 20) in the sleeve $f^5$, which is mounted in the bearing $a''$, of the bracket standard $a^{12}$. The key $f^{42}$, and longitudinal groove $f^{41}$, couple the sleeve $f^5$, and shaft $f^4$, so that they rotate together while allowing the shaft $f^4$, to slide longitudinally in said sleeve $f^5$. On the rear end of said sleeve $f^5$, is rigidly attached the sprocket wheel $f^{51}$, which is connected by the sprocket chain $f^6$, with sprocket teeth on the hub $j$, of the cam J. Thus the cam J, and the shaft $f^4$, travel together at the same rate of speed, and transmit the same speed and motion through the medium of the sprocket chain $f^2$, to the spindle $f$, of the piercing punch F. By thus rotating the piercing punch F, it works its way through the agglomerate charge $x$, without any danger of lateral bend or deviation from true alinement; and also may be withdrawn with much less danger of chipping or breaking the perforated charge.

During the above described operation of piercing the cylindrical charge $x$, of agglomerate to form a tube, the next succeeding holder $d^2$, in the disk $D^2$, has received the succeeding compressed cylindrical charge $x$, of agglomerate, as illustrated in Figs. 10, and 11.

The next quarter rotation of the intermittent rotor D, effected by the intermittent shaft R, as before described through the medium of the gears $r$, $k$, and $d^8$, carries the holder $d'$, into coincidence with the placing punch G, (see Figs. 27, to 29, inclusive) by which the carbon pencil or "core" $x'$, (Fig. 18) is inserted in the axial bore or hole just formed for it in the "bobbin" or cylinder $x$.

The carbon cores $x'$, are fed to the axial pocket $g$, in the sleeve $g'$, in which the forwarding punch G, operates, from a hopper S, which is rigidly supported upon the bearing sleeve $a^{28}$, forming the top of the standard $a^{14}$, which is rigidly attached to the bracket $a^{15}$, which forms a forward extension of the table $a$, (see Fig. 4). The sides of this hopper S, are inclined convergently, as shown in Fig. 12, so as to feed the carbon cores $x'$, by gravity to the central exit port $s$, at the bottom of the hopper, through which exit port $s$, the cores $x'$, descend, one by one, into the pockets of the feed wheel $s'$, which is mounted upon the forward end of the shaft $s^2$, which is journaled in the aforesaid bearing sleeve $a^{23}$, of the standard $a^{14}$, (Figs. 4, and 15) the rear end of said shaft $s^2$, having rigidly attached to it the ratchet wheel $s^3$, which is actuated by a pawl $s^4$, pivotally supported between the twin rock levers $s^5$, $s^5$, (see Figs. 4, and 8) fulcrumed on said shaft $s^2$, said rock levers $s^5$, $s^5$, being oscillated by means of the pitman $s^6$, to which they are pivotally connected, and said pitman $s^6$, being reciprocated by reason of its pivotal connection with the crank-sprocket wheel $s^7$, rigidly mounted on the rear end of the shaft $s^8$, (Fig. 8) which is journaled in the bearing sleeve $a^{33}$, on the end of the extension arm $a^{13}$, of the bracket $a^{12}$, which is rigidly secured to the top of the box bracket $a^7$, as shown particularly in Fig. 15.

The crank-sprocket wheel $s^7$, is connected by a sprocket chain $s^9$, with the sprocket wheel $f^{42}$, on the sleeve $f^5$, of shaft $f^4$, which is slidably mounted, as hereinbefore stated, in said sleeve $f^5$, and the bearing $a''$, on said standard $a^{12}$. Hence the shaft $s^8$, rotates in unison with said slide-shaft $f^4$, which shaft $f^4$, and its sleeve $f^5$, are rotated by the sprocket chain $f^6$, which engages with the sleeve sprocket $f^{51}$, and with the sprocket teeth in the hub $j$, of the cam J. Since the cam J, makes one rotation for each rotation of the power shaft P, as hereinbefore described, it is obvious that through the means of the intermediate sprocket wheels and chains, the shaft $s^8$, and crank sprocket $s^7$, will also rotate once for each rotation of the power shaft and hence the pitman $s^6$, will rock the pawl levers $s^5$, once during that period causing the pawl $s^4$, to advance the ratchet wheel $s^3$, sufficiently to release a carbon core $x'$, from the hopper.

The latter are thus delivered successively to the inclined way $s^{10}$, by which they are delivered, if perfect, to the axial pocket $g$, in the sleeve $g'$ mounted in the fixed bearing $s^{14}$. If broken or imperfect they drop from the feed wheel $s'$, through the relief exit $s''$, into a receptacle $s^{13}$, provided for the purpose. The relief exit $s''$, is shown in cross detail in Fig. 14, in which a perfect core is shown in dotted lines as bridging the opening $s''$, with its ends resting on the edges thereof, while in solid lines a defective core is shown as making its exit through said opening.

As only one core $x'$, is released from the hopper S, at each quarter turn of the carrier disk $D^2$, the inclined way $s^{10}$, is of such length as to accommodate a sufficient number of cores to compensate for any broken or defective cores discarded as above stated. That is to say there is always a surplus of cores on said feed way $s^{10}$; the lowest core in the column resting in the axial groove $g$, with the others in alinement above it.

When the punch G, advances it encounters the lowest core, that in the axial groove $g$, and causes the latter to push the last preceding core into the bore or hole in the tubular cylindrical charge in the holder $d'$, as shown in Fig. 28. At this point the head $c^{40}$, of the cross head C', encounters the forward extension $g^2$, of the sleeve $g'$, on which is the collar $g^3$, between which collar $g^3$, and the washer $g^4$, is interposed the coiled spring $g^5$, said washer $g^4$, bearing against the bracket bearing $g$, and closing the bearing in which sleeve $g'$, rests.

The continued advance of the cross head C', presses back the sleeve $g'$, against the resistance of the spring $g^5$, pushing the core $x'$, farther into the bore of the apertured cylindrical charge $x$, as shown in Fig. 29, and bringing the tip $g^6$, of the charge presser $g^7$, into contact with the outer end of the charge of agglomerate $x$. At the same time the tip $a^x$, of the abutment $a^{10}$, is advanced into contact with the other end of said charge $x$, the two tips $g^6$, and $a^x$, exerting an endwise pressure thereon and compressing it longitudinally.

During this endwise pressure on the charge $x$, both nipples or tips $a^x$ and $g^6$ are partially rotated on their axes for the purpose of smoothing the ends of the charge and preventing the material thereof adhering to said nipples when they are withdrawn.

The stem of the charge presser $g^7$, is threaded to engage with a female screw thread formed for it in the sleeve $g'$, and its partial rotation is effected by means of a pitman $s^x$, pivotally connected with an arm $g^x$, (Fig. 24) of the core presser $g^x$, and with the crank disk $s^{81}$, (Fig. 12) on the front end of the shaft $s^8$. Thus the partial rotation of the core presser $g^7$, not only twists the face of the nipple $g^6$, in contact with the end of the charge $x$, but also, by reason of its screw connection with the sleeve $g'$, causes said nipple $g^6$, to compress the charge longitudinally as before stated with the opposed nipple $a^x$, of the abutment $a^{10}$, as a point of resistance.

The corresponding partial rotation of the abutment $a^{10}$, is effected by means of a pitman $a^{21}$, pivotally connected to an arm $a^{31}$, on the shank or spindle $a^{101}$, of said abutment $a^{10}$, the upper end of said pitman $a^{21}$, being connected with the strap of an eccentric $a^{22}$ on the shaft $s^8$. The rotation of the eccentric $a^{22}$, causes the pitman $a^{21}$, to rock the abutment $a^{10}$, against the resistance of the spring $a^{41}$, (Fig. 22) interposed between a nut collar $a^{42}$, on the end of the spindle $a^{101}$, and the bearing sleeve $a^{17}$, rigidly secured to the box bracket $a^7$, and within which said spindle shank $a^{101}$, is mounted. This spring $a^{41}$, tends constantly to draw the abutment $a^{10}$, back with its radial pin $a^{18}$, in contact with the cam surface $a^{19}$, on the bearing sleeve $a^{17}$, as shown more particularly in Figs. 22, and 23, and to hold said pin $a^{18}$, at the rear end of said cam surface. Thus when the eccentric $a^{22}$, raises the pitman $a^{21}$, the pin $a^{18}$, will be forced up the cam surface $a^{19}$, against the resistance of said spring $a^{41}$, thereby not only rocking the nipple $a^x$, to twist its surface in contact with the rear end of the charge of agglomerate $x$, but also advancing said nipple $a^x$, so that it compresses the agglomerate charge $x$, endwise against the resistance of the opposed nipple $g^6$, on the charge presser $g^7$, of the sleeve $g'$, as shown in Fig. 29.

The next quarter rotation of the carrier disk $D^2$, brings the holder $d'$, into coincidence with the ejecting punch H. The charge arrives in this position with its core $x'$, protruding forward as shown in Fig. 16. When the punch H, comes in contact with the protuberant end of the core $x'$, it forces the latter into the tubular cylindrical charge $x$, so that the core $x'$, projects to the rear of the charge $x$, and is flush with the front end thereof as shown in Fig. 17. It also contacts with the front end of the cylinder of agglomerate, and for this reason is given a rotary motion to prevent its adherence thereto.

This rotary motion is imparted to the shank $h$, of the punch H, by means of a sprocket chain $h'$, engaging with sprocket teeth on said hub $h$, and on the hub $f'$, of the shank $f$, of the perforating punch F, as shown in Fig. 16, particularly.

The finished bobbins $x,-x'$, fall from the holder $d'$, into pockets $u$, of a conveyer U, from which they are removed by hand or otherwise, as may be found most expedient.

The shank $g''$, of the plunger G, is mounted in a bearing sleeve $c^{41}$, supported adjustably in a bushing $c^{44}$, rigidly secured to the socket $c^{40}$ of the cross head C'. Said shank $g''$, is formed with a male thread $g^{12}$, engaging a female thread formed for it in said bearing sleeve $c^{41}$. Said shank $g''$, is also provided with a handle $g^{13}$, or equivalent by which it may be turned to regulate the extent of protuberance of the plunger G. A set screw $g^{14}$, may be used to secure the shank $g''$, in prescribed position.

The bearing sleeve $c^{41}$, is also formed with a male screw thread $c^{42}$, engaging with a female thread formed for it in the bushing $c^{44}$, so that the said sleeve $c^{41}$, may be adjusted in said bushing $c^{44}$, to regulate the protuberance, if any desired, of its inner end $g^{15}$, beyond the inner end of said bushing $c^{44}$, for the purpose of prescribing the operative thrust of the socket $c^{40}$, as related to the forward end of the extension $g^2$, of the sleeve $g'$, and thereby regulating the inward thrust of said sleece $g'$, as related to the transfer disk $D^2$, and holders mounted thereon. Thus the extent of longitudinal compression exerted against the charge of agglomerate $x$, may be prescribed with accuracy according to the density and compactness required, as well as also a desired predetermined length of the finally compressed charge.

We have herein shown and described our apparatus as adapted to the automatic manufacture of carbon elements for dry batteries, etc. By its use as compared with the old method of production by hand labor, we greatly reduce the cost of manufacture and attain a better and more perfect product, in that it is more compact, homogeneous and uniform in shape and structure, and hence of longer "life" and efficiency.

But essential features of our invention and apparatus are applicable for the manufacture of other products, formed from comminuted material, such cakes or briquets for various purposes, so that we do not wish to restrict ourselves to the manufacture of battery carbon elements exclusively.

It is obvious that various modifications may be made in the construction shown in the drawings and above particularly described within the principle and scope of our invention.

Hence what we claim as our invention and desire to secure by Letters Patent is,

1. In apparatus of the character designated, in combination, an intermittently rotatable carrier and transfer disk formed with a plurality of equidistant receivers, means for automatically and laterally compressing and molding a charge of comminuted material and introducing it into one of the receivers in said transfer disk, means for automatically piercing said charge, and means for automatically rotating said piercing means while in contact with the charge for the purpose set forth.

2. In apparatus of the character designated, in combination, an intermittently rotatable carrier and transfer disk formed with a plurality of equidistant receivers, means for automatically and laterally compressing and molding a charge of comminuted material and introducing it into one of the receivers in said transfer disk, means for automatically piercing said charge, means for automatically introducing a core into said pierced charge and simultaneously compressing the charge endwise, and means for automatically rotating said compressing means while in contact with the charge, for the purpose described.

3. In apparatus of the character designated in combination, an intermittently rotatable carrier and transfer disk formed with a plurality of equidistant receivers, means for automatically and laterally compressing and molding a charge of comminuted material and introducing it into one of the receivers in said transfer disk, means for automatically piercing the charge, means for automatically introducing a core into said charge, and means for automatically feeding the cores to said core-introducing means, said automatic feed being formed with a discard exit for the escape of defective cores.

4. In apparatus of the character designated, in combination, an intermittently rotatable carrier and transfer disk formed with a plurality of equidistant receivers, means for automatically and laterally compressing and molding a charge of comminuted material and introducing it into one of the receivers in said transfer disk, means for automatically piercing the charge, means for automatically introducing a core into said charge, and means for automatically feeding the cores to said core-introducing means, said automatic feed being formed with an inclined runway having a medial opening for the discharge of broken cores.

5. In apparatus of the character designated, in combination, an intermittently rotatable carrier and transfer disk formed with a plurality of equidistant receivers, means for automatically and laterally compressing and molding a charge of comminuted material and introducing it into one of the receivers in said transfer disk, means for automatically piercing said charge, means for automatically introducing a core into said pierced charge, means for compressing the charge endwise simultaneously with the introduction of the core, and means for regulating the extent of such endwise compression of the charge.

6. In apparatus of the character designated, in combination, an intermittently rotatable carrier and transfer disk formed with a plurality of equi-distant receivers, means for automatically and laterally compressing and molding a charge of comminuted material and introducing it into one of the receivers in said transfer disk, means for automatically piercing said charge, means for automatically introducing a core into said pierced charge and simultaneously compressing said charge endwise including a rear abutment against which the charge is compressed, and means for automatically rotating said rear abutment while in contact with the charge, for the purpose described.

7. An automatic machine for forming battery elements, such machine having, in combination, a mold, means for automatically introducing a charge of depolarizing material into the mold and for compressing such charge endwise in the mold, means for automatically piercing said charge, and means for automatically imparting rotative movement to said piercing means while such means is in contact with the charge.

8. An automatic machine for forming battery elements, such machine having, in combination, a mold, means for automatically introducing a charge of depolarizing material into the mold, compressing means, means for automatically piercing said charge, and means for automatically imparting rotative movement to said piercing means while such means is in contact with the charge.

9. An automatic machine for forming battery elements, such machine having, in combination, a mold, means for automatically introducing a charge of depolarizing material into the mold, compressing means, means for automatically piercing said charge, means for automatically introducing an electrode rod into the pierced charge, means for automatically compressing the rod-containing charge endwise, and means for automatically imparting rotative movement to said compressing means while in contact with the charge.

10. An automatic machine for forming battery elements, such machine having, in combination, a mold, means for automatically introducing a charge of depolarizing material into the mold, compressing means, means for automatically piercing said charge, means for automatically introducing an electrode rod into the pierced charge, and means for automatically compressing the rod-containing charge endwise.

11. An automatic machine for forming battery elements, such machine having, in combination, a mold, means for automatically introducing a charge of depolarizing material into the mold, compressing means, means for automatically piercing said charge, means for automatically introducing an electrode rod into the pierced charge, means for automatically compressing the rod-containing charge endwise in the mold, such compressing means including an abutment member and a compressing member, and means for automatically imparting rotative movement to both of these members while they are in contact with the charge.

12. An automatic machine for forming battery elements, such machine having, in combination, a mold, means for automatically introducing a charge of depolarizing material into the mold, means for automatically piercing said charge, means for automatically imparting rotative movement to said piercing means while in contact with the charge, means for automatically introducing an electrode rod into the pierced charge, means for automatically compressing the rod-containing charge endwise in the mold, and means for automatically imparting rotative movement to said compressing means while in contact with the charge.

13. The invention claimed in claim 12 in combination with an ejector for automatically pushing the completed battery element out of the mold, and means for automatically imparting rotative movement to said ejector while it is in contact with said element.

14. An automatic machine for forming battery elements, such machine having, in combination, a mold, means for automatically introducing a charge of depolarizing material into the mold, means for automatically piercing the charge, means for automatically introducing an electrode rod into the pierced charge, and means for automatically feeding the electrode rods to said rod-introducing means, said automatic feeding means including means for discarding defective electrode rods.

15. An automatic machine for forming battery elements, such machine having, in combination, means for forming a tube of depolarizing material, means for inserting an electrode rod into said tube, and means for compressing the depolarizing material around the electrode rod and to a predetermined length.

16. An electrode-making machine, having, in combination, a mold, a mandrel, means for forming a tube of depolarizing material around the mandrel in the mold, means for inserting an electrode rod into said tube in the mold, means for compressing the depolarizing material around the electrode rod, and means for discharging the completed electrode from the mold.

17. An electrode-making machine, having, in combination, a mold, means for forming a tube of depolarizing material in the mold, a plunger for inserting an electrode rod into said tube in the mold, and a plunger for compressing the depolarizing material around the electrode rod and to a predetermined length.

18. An automatic machine for forming battery elements, such machine having, in combination, means for forming a charge of depolarizing material having a hole therein, means for inserting an electrode rod into said hole, and means for compressing the depolarizing material around the electrode rod.

19. An automatic machine for forming battery elements, such machine having, in combination, means for forming a charge of depolarizing material, and means for pushing an electrode rod longitudinally through said charge until it projects from the opposite end thereof.

20. An automatic machine for forming battery elements, such machine having, in combination, means for forming a charge of depolarizing material having a hole therein, and means for inserting an electrode rod into said hole and pushing this electrode rod through the charge of depolarizing material until it projects from the other end thereof.

21. An automatic machine for forming battery elements, such machine having, in combination, a mold, means for automatically introducing a charge of depolarizing material into the mold, means for compressing and forming a hole in the charge of depolarizing material in the mold, and means for inserting an electrode rod into said hole and pushing this electrode rod through the charge of depolarizing material in the mold until it projects from the other end thereof.

22. An automatic machine for forming battery elements, such machine having, in combination, means for forming a charge of depolarizing material having a hole therein, means for inserting an electrode rod into said hole, means for compressing the depolarizing material around the electrode rod, and means for pushing the electrode rod along in the compressed charge of depolarizing material until it projects from the other end thereof.

23. An automatic machine for forming battery elements, such machine being of the kind in which a series of plungers act successively upon a charge of depolarizing material in a mold to compress it therein and to insert in such charge an electrode rod which projects therefrom at one end, and characterized by the fact that means are provided for inserting the electrode rod into such charge from one side of the mold and pushing it through until it projects from such charge at the other side of the mold.

24. An automatic machine for forming battery elements, such machine being of the kind in which a rotating turret carries a series of molds containing depolarizing material which is acted upon by a series of plungers for successively forming battery elements in each of which an electrode rod projects from one end of the molded mass of depolarizing material, and characterized by the fact that these plungers push the electrode rod through the mold until it projects from the other end of the material contained in the mold.

25. The invention claimed in claim 18 in combination with means for automatically imparting rotative movement to said compressing means while such means is in contact with the charge.

26. An automatic machine for forming battery elements, such machine having, in combination, means for automatically introducing an electrode rod into a charge of depolarizing material, and means for automatically feeding the electrode rods to said rod-introducing means, said automatic feeding means including means for discarding defective electrode rods.

27. An automatic machine for forming battery elements, such machine having, in combination, a mold, means for automatically inserting an electrode rod into the mold, and means for automatically feeding the electrode rods to said rod-inserting means, said automatic feeding means including means for discarding defective electrode rods.

SAMUEL SOKOLOW.
SAMUEL POLINSKY.

Witnesses:
ARTHUR SHAPIRO,
MORRIS LEVINE.